United States Patent
Bremler-Barr et al.

(10) Patent No.: US 8,504,510 B2
(45) Date of Patent: Aug. 6, 2013

(54) STATE MACHINE COMPRESSION FOR SCALABLE PATTERN MATCHING

(75) Inventors: Anat Bremler-Barr, Ramat Hasharon (IL); David Hay, Haifa (IL); Yaron Koral, Hod Hasharon (IL)

(73) Assignee: Interdisciplinary Center Herzliya, Herzliya (IL)

( * ) Notice: Subject to any disclaimer, the term of this patent is extended or adjusted under 35 U.S.C. 154(b) by 362 days.

(21) Appl. No.: 12/985,354

(22) Filed: Jan. 6, 2011

(65) Prior Publication Data

US 2011/0167030 A1    Jul. 7, 2011

Related U.S. Application Data

(60) Provisional application No. 61/292,866, filed on Jan. 7, 2010.

(51) Int. Cl.
*G06N 5/02* (2006.01)

(52) U.S. Cl.
USPC .......................................................... 706/48

(58) Field of Classification Search .................. None
See application file for complete search history.

(56) References Cited

U.S. PATENT DOCUMENTS

| | | | |
|---|---|---|---|
| 5,455,577 | A | 10/1995 | Slivka et al. |
| 6,883,137 | B1 | 4/2005 | Girardot et al. |
| 7,051,126 | B1 | 5/2006 | Franklin |
| 2002/0021838 | A1 | 2/2002 | Richardson et al. |
| 2004/0111439 | A1 | 6/2004 | Richardson et al. |
| 2004/0190635 | A1 | 9/2004 | Ruehle |
| 2005/0149888 | A1* | 7/2005 | Gunawardana ............... 716/2 |
| 2006/0050968 | A1 | 3/2006 | Oh et al. |
| 2008/0046423 | A1 | 2/2008 | Alicherry et al. |
| 2009/0228474 | A1* | 9/2009 | Chiu et al. .................... 707/5 |

OTHER PUBLICATIONS

Chim et al. Efficient Phrase-Based Document Similarity for Clustering, IEEE TKDE, vol. 20, No. 9, 2008, pp. 1217-1229.*
Zamir et al. "Web Document Clustering: A Feasibility Demonstration", SIGIR, 1998, pp. 9.*
Zane et al., "CoolCAMs: Power-Efficient TCAMs for Forwarding Engines", IEEE INFOCOM 2003, San Francisco, USA, Mar. 30-Apr. 3, 2003.
Agrawal et al., "Modeling TCAM Power for Next Generation Network Devices", Proceedings of IEEE International Symposium on Performance Analysis of Systems and Software (ISPASS-2006), Austin, USA, Mar. 19-21, 2006.

(Continued)

*Primary Examiner* — Li-Wu Chang
(74) *Attorney, Agent, or Firm* — D. Kligler I.P. Services Ltd.

(57) ABSTRACT

A method for processing data includes encoding a finite automaton, which includes states and transitions between the states that express a plurality of predefined patterns, by grouping the states of the automaton into sets according to a common property shared by the states in each set, and assigning codes to the states according to the grouping. The codes are stored in an electronic memory, along with rules that are associated with the patterns. The automaton is traversed in order to identify one or more of the patterns in an input sequence of data elements by iteratively reading out the codes from the memory responsively to the data elements and to the codes that have been previously read out. Upon identifying a given pattern in the input sequence, an associated action is performed.

33 Claims, 12 Drawing Sheets

OTHER PUBLICATIONS

Lin et al., "Route Table Partitioning and Load Balancing for Parallel Searching with TCAMs", 2007 IEEE International Parallel and Distributed Processing Symposium, Long Beach, USA, Mar. 26-30, 2007.

Hopcroft, J.E., "An N Log N Algorithm for Minimizing States in a Finite Automation", Stanford University, Jan. 1971.

Yu et al., "Gigabit Rate Packet Pattern-Matching Using TCAM", Proceedings of the 12th IEEE International Conference on Network Protocols (ICNP'04), Berlin, Germany, Oct. 5-8, 2004.

Weinsberg et al., "High Performance String Matching Algorithm for a Network Intrusion Prevention System (NIPS)", High Performance Switching and Routing, pp. 147-153, Poznan, Poland, Jun. 7-9, 2006.

Clamav, "Clam AntiVirus 0.96" User Manual, Mar. 31, 2010.

U.S. Appl. No. 13/013,835 Office Action dated Oct. 29, 2012.

Aho et al., "Efficient String Matching: An Aid to Bibliographic Search", Communications of the ACM, vol. 18, No. 6, pp. 333-340, Jun. 1975.

Deutsch, P., "DEFLATE Compressed Data Format Specification version 1.3", Network Working Group, RFC 1951, May 1996.

Ziv et al., "A Universal Algorithm for Sequential Data Compression", IEEE Transactions on Information Theory, vol. IT-23, No. 3, pp. 337-343, May 1977.

Navarro et al., "A General Practical Approach to Pattern Matching over Ziv-Lempel Compressed Text", Tenth Annual Symposium on Combinatorial Pattern Matching, Warwick University, UK, Jul. 22-24, 1999.

Farach et al., "String Matching in Lempel-Zip Compressed Strings", 27th Annual ACM Symposium on the Theory of Computing, pp. 703-712, Las Vegas, USA, May 29-Jun. 1, 1995.

Kumar et al., in "Algorithms to Accelerate Multiple Regular Expressions Matching for Deep Packet Inspection", Proceedings of ACM SIGCOMM'06, Pisa, Italy, Sep. 12-15, 2006.

Wu et al., "A Fast Algorithm for Multi-Pattern Searching", Technical Report TR-94017, Department of Computer Science, University of Arizona, May 1994.

U.S. Appl. No. 13/013,835, filed Jan. 26, 2011.

Fisk et al., "Applying Fast String Matching to Intrusion Detection", Technical Report CS2001-0670, year 2002.

Deutsch, P., "Gzip file format specification version 4.3", Network Working Group, RFC 1952, May 1996.

Website Optimization, LLC., "Introduction to Web Site Optimization", Jan. 2007.

Huffman D., "A Method for the Construction of Minimum-Redundancy Codes", Proceedings of IRE, p. 1098-1101, Sep. 1952.

Zlib, "A Massively Spiffy Yet Delicately Unobtrusive Compression Library", Apr. 19, 2010 (www.zlib.net).

Boyer et al., "A fast string searching algorithm", Communications of the ACM, vol. 20, No. 10, pp. 762-772, Oct. 1977.

SNORT Users Manual, Apr. 15, 2008.

Song et al., "A memory efficient multiple pattern matching architecture for network security", INFOCOM 2008, pp. 166-170, Phoenix, USA, Apr. 13-17, 2008.

Van Lunteren, J., "High-performance pattern-matching engine for intrusion detection", INFOCOM 2006, 25th IEEE International Conference on Computer Communications, pp. 1-13, Barcelona, Spain, Apr. 23-29, 2006.

Dimopoulos et al., "A memory efficient reconfigurable aho-corasick fsm implementation for intrusion detection systems", Proceedings of the 2007 International Conference on Embedded Computer Systems: Architectures, Modeling and Simulation (IC-SAMOS 2007), pp. 186-193, Samos, Greece, Jul. 16-19, 2007.

Tuck et al., "Deterministic memory efficient string matching algorithms for intrusion detection", INFOCOM 2004, Hong Kong, China, Mar. 7-11, 2004.

Alicherry et al., "High speed pattern matching for network ids/ips", 14th IEEE International Conference on Network Protocols, pp. 187-196, Santa Barbara, USA, Nov. 12-15, 2006.

Amir et al., "Let sleeping files lie: Pattern matching in z-compressed files", Journal of Computer and System Sciences, vol. 52, issue 2, pp. 299-307, Apr. 1996.

Kida et al., "Shift-and approach to pattern matching in lzw compressed text", 10th Annual Symposium on Combinatorial Pattern Matching, Warwick University, UK, Jul. 22-24, 1999.

Navarro et al., "Boyer-moore string matching over ziv-lempel compressed text", Proceedings of the 11th Annual Symposium on Combinatorial Pattern Matching, pp. 166-180, Montreal, Canada, Jun. 21-23, 2000.

Klein et al., "A new compression method for compressed matching", Proceedings of data compression conference DCC-2000, pp. 400-409, Snowbird, USA, Mar. 28-30, 2000.

Bremler-Barr et al., "Accelerating multi-patterns matching on compressed HTTP Traffic", INFOCOM 2009, Rio de Janeiro, Brazil, Apr. 19-25, 2009.

Manber U., "A text compression scheme that allows fast searching directly in the compressed file", ACM Transactions on Information Systems (TOIS), vol. 15, issue 2, pp. 124-136, Apr. 1997.

Takeda et al., "Speeding up string pattern matching by text compression. The dawn of a new era", Information Processing Society of Japan Journal, vol. 24, No. 3, pp. 370-384, Mar. 2001.

Ziviani et al., "Compression: A key for next generation text retrieval systems", IEEE Computer, vol. 33, No. 11, Nov. 2000.

Fisk et al., "Fast Content-Based Packet Handling for Intrusion Detection", UCSD Technical Report CS2001-0670, May 2001.

Ristic, I., "Introducing Mod Security", Nov. 26, 2003.

Cormen et al., "Introduction to Algorithms", second edition, The MIT Press and McGraw-Hill Book Company, 2001.

Hopcroft et al., "Introduction to Automata Theory, Languages, and Computation", Chapter 2, pp. 37-81, second edition, Addison-Wesley, 2001.

Port 80 Software, "Port80 surveys the top 1000 corporations' web servers", years 2002-2007.

U.S. Appl. No. 61/466,012, filed Mar. 22, 2011.

Behr, A., "Midrange Firewalls Face Off", Jul. 23, 2004 (http://www.infoworld.com/print/14089).

Fielding et al.., "Hypertext Transfer Protocol—HTTP/1.1", Network Working Group, RFC 2616, Jun. 1999.

Tan et al., "Architectures for Bit-Split String Scanning in Intrusion Detection", IEEE Micro, No. 1, pp. 110-117, Jan.-Feb. 2006.

Liu et al.., "A Fast Pattern-Match Engine for Network Processor-based Network Intrusion Detection System", Proceedings of the International Conference on Information Technology: Coding and Computing, pp. 97-101, Las Vegas, USA, Apr. 5-7, 2004.

Pao et al., "Pipelined Architecture for Multi-String Matching", IEEE Computer Architecture Letters, vol. 7, issue 2, Jul. 2008.

Lin et al., "Pipelined Parallel AC-based Approach for Multi-String Matching", 14th IEEE International Conference on Parallel and Distributed Systems, Melbourne, Australia, Dec. 8-10, 2008.

Yu et al., "SSA: A Power and Memory Efficient Scheme to Multi-Match Packet Classification", Proceedings of the 2005 ACM symposium on Architecture for networking and communications systems, Princeton, USA, Oct. 26-28, 2005.

Global Technology Associates, Inc., "GB-8001 GB-800e: Small Office Firewalls supporting Mail Sentinel Anti-Spam and Anti-Virus", Data sheet, Feb. 12, 2004.

Sonicwall Inc., "SonicWALL PRO 3060 Getting Started Guide", Jun. 2005.

Stonesoft Corporation, "StoneGate Firewall/VPN", year 2009.

Juniper Networks, Inc., "SRX 5800 Specification", year 2010.

Cisco Systems, Inc., "Cisco ASA 5500 Series Firewall Edition for the Enterprise", years 1992-2006.

Song et al., "IPv6 Lookups using Distributed and Load Balanced Bloom Filters for 100Gbps Core Router Line Cards", INFOCOM 2009, Rio de Janeiro, Brazil, Apr. 19-25, 2009.

Ruiz-Sanchez et al., "Survey and Taxonomy of IP Address Lookup Algorithms", IEEE Network, Mar./Apr. 2001.

Panigrahy et al., "Reducing TCAM Power Consumption and Increasing Throughput", Proceedings of the 10th Symposium on High Performance Interconnects HOT Interconnects , pp. 107-112, Stanford, USA, Aug. 21-23, 2002.

Taylor, D., "Survey & Taxonomy of Packet Classification Techniques", May 10, 2004.

\* cited by examiner

Algorithm 1 State Grouping. Calculating the parameters CS and LCS for all states.

1: for all state $s \in S$ do
2:     if $s$ has more than one incoming link then
3:         $CS(s) := \text{label}(s)$ without the link symbol
4:     else
5:         $CS(s) := \bot$                                    $\triangleright$ $\bot$ is the empty word
6:     end if
7: end for
8: for all state $s \in S$ do
9:     $O_s :=$ states within distance 1 of $s$ on the DFA graph
                                  $\triangleright$ $s$ has an outgoing transition to each $s' \in O_s$
10:     $LCS(s) := CS(s')$ with maximal length among all $s' \in O_s$
11: end for

FIG. 5

Algorithm 2 Constructing the Common Suffix Tree
1: $L := \{LCS(s) | s \in S\}$                                 ▷ the set of all LCS values
2: build a Common Suffix Tree with vertex set $L$ such that
   for every $\ell_1, \ell_2 \in L$, $\ell_1$ is an ancestor of $\ell_2$ if and only if $\ell_1$ is a suffix of $\ell_2$
3: for all suffix tree node $\ell \in L$ do
4:    if $\ell$ is not a leaf in the Common Suffix Tree then
5:       $n :=$ number of node $\ell$'s children                     ▷ $n > 0$
6:       add $x$ *connecting nodes* as a children to $\ell$ such that $n + x$ is a power of 2 and $x \geq 1$
7:    end if
8: end for
9: for all state $s \in S$ do
10:    if $LCS(s)$ is a leaf in the Common Suffix Tree then
11:       link $s$ as a child of $LCS(s)$
12:    else
13:       link $s$ as a child of the connecting node of $LCS(s)$ with the least number of children    ▷ all children of an LCS are balanced between its connecting nodes
14:    end if
15: end for

FIG. 6

Algorithm 3 State and Rule Encoding

1: for all edges $\langle \ell_1, \ell_2 \rangle$ of the Common Suffix Tree do
2:    length($\langle \ell_1, \ell_2 \rangle$) := log[number of $\ell_1$'s children]
      ▷ the number of bits required to enumerate over all outgoing edges of $\ell_1$
3: end for
4: $w$ := the length of the longest path in the tree
      ▷ $w$ is the *code width*, the number of bits required to encode the tree
5: enumerate all edges of each node
      ▷ each edge get a code of width equals to its length
6: for all node $\ell$ of the Common Suffix Tree do
7:    assign the code of $\ell$ as the concatenation of all edges' codes on the path between the $\ell$ and the root. Pad with 0 to fit width $w$.
8: end for

9: $S' := \{s \in S \mid CS(s) = \bot\}$

10: for all states $s \in S \setminus (S' \cup \{s_0\})$ do
11:    add the following rule to the rule set:
12:       current-state set is the code of node $CS(s)$
13:       symbol is the label on the incoming link of $s$
14:       next state is the code of node $s$
15: end for
16: for all states $s' \in S'$ do
17:    for all $s \in S, x \in \Sigma$ such that $\delta(s, x) = s'$ do
18:       add the following rule to the rule set:
19:          current-state set is the code of node $s$
20:          symbol is $x$
21:          next state is the code of node $s'$
22:    end for
23: end for
24: add the following rule for $s_0$:
25:    current-state set is $w$ bits of $*$
26:    symbol is $*$
27:    next state is the code of node $s_0$

FIG. 7

Algorithm 4 Truncated Rule Encoding

1: for all leaf vertexes $v$ of the Common Suffix Tree do
2:    if $v$'s depth $> D$ then         ▷ $v$ corresponds to a state
3:       attach $v$ to its ancestor of depth $D$ in the tree
4:    end if
5: end for
6: truncate the Common Suffix Tree at depth $D$
7: execute lines 1 − 9 of Algorithm 3
8: $S' := S' \cup \{s \in S \mid CS(s)$ does not appear in the tree$\}$
9: execute lines 10 − 27 of Algorithm 3

FIG. 8

Algorithm 5 State Grouping. Calculating the family of sets $F$ for a stride of $k$ edges 1: $F := \emptyset$
2: for all state $s \in S$ do
3:    if depth$(s) > k$ and $s$ is not an accepting state then
4:       $S_s := \{s' \mid$ there is a path of length $k$ from $s'$ to $s$ in the DFA$\}$
5:       if $|S_s| > 1$ then
6:          $F := F \cup \{S_s\}$
7:       end if
8:    else if depth$(s) > k$ and $s$ is an accepting state then
9:       for $j = 1, \ldots, k$ do
10:          $S_s(j) := \{s' \mid$ there is a path of length $j$ from $s'$ to $s$ in the DFA$\}$
11:          if $|S_s(j)| > 1$ then
12:             $F := F \cup \{S_s(j)\}$
13:          end if
14:       end for
15:    end if
16: end for

FIG. 9

Algorithm 6 Rule Encoding for stride of length $k$
1: for all states $s$ such that depth$(s) \leq k$ do
2:     add the following rule to the rule set:
         current-state set is $w$ '*' symbols
         symbol is label$(s)$, padded with $k -$ depth$(s)$ '*' symbols to
            the left.
         next state is the code of node $s$
3: end for
4: for all non-accepting states $s$ with depth$(s) > k$ do
5:     if $S_s \in F$ then            ▷ Set $S_s$ as defined in Algorithm 5
6:        add the following rule to the rule set:
            current-state set is the code of $S_s$
            symbol is the last $k$ symbols of label$(s)$
            next state is the code of node $s$
7:     else    ▷ $S_s = \{s'\}$
8:        add the following rule to the rule set:
            current-state set is the code of $s'$
            symbol is the last $k$ symbols of label$(s)$
            next state is the code of node $s$
9:     end if
10: end for
11: for all accepting states $s$ do
12:     for $j = 1, \ldots, k$ do
13:        if $S_s(j) \in F$ then      ▷ Set $S_s(j)$ as defined in Algorithm 5
14:           add the following rule to the rule set:
                current-state set is the code of $S_s(j)$
                symbol is the last $j$ symbols of label$(s)$, padded with
                   $k - j$ '*' symbols to the right.
                next state is the code of node $s$
15:        else    ▷ $S_s(j) = \{s'\}$
16:           add the following rule to the rule set:
                current-state set is the code of $s'$
                symbol is the last $j$ symbols of label$(s)$, padded with
                   $k - j$ '*' symbols to the right.
                next state is the code of node $s$
17:        end if
18:     end for

FIG. 10

Algorithm 7 State Grouping for Regular Expression DFA, extends Algorithm 1

1: for all state $s \in S$ do
2:     agg := false
3:     CS := label($s$) without the last symbol
4:     for all incoming links $(s', s)$ to state $s$ do
5:        $x$ := the symbol on the edge $(s', s)$      ▷ i.e., $\delta(s', x) = s$
6:        if label($s'$) = CS then
7:           aggregate($(s', s)$) := true
8:        else if label($s$) is the longest suffix of label($s'$)$x$ then
                                                                         ▷ among all state labels
9:           aggregate($(s', s)$) := true
10:          agg := true
11:        end if
12:     end for
13:     if agg = true then
14:        CS($s$) := CS
15:     else
16:        CS($s$) := $\perp$
17:     end if
18: end for
19: for all state $s \in S$ do
20:     $O_s$ := states within distance 1 of $s$ on the DFA graph
                             ▷ $s$ has an outgoing transition to each $s' \in O_s$
21:     LCS($s$) := CS($s'$) with maximal length among all $s' \in O_s$
22: end for

FIG. 11

Algorithm 8 Rule Encoding for Regular Expression DFA
1: execute Algorithm 3
2: for all edges $\langle s', s \rangle$ do
3:     if aggregate($\langle s', s \rangle$)=false then
4:         add the following rule to the rule set:
5:             current-state is the code of node $s'$
6:             symbol is the symbol on $\langle s', s \rangle$
7:             next state is the code of node $s$
8:     end if
9: end for

FIG. 12

STATE MACHINE COMPRESSION FOR SCALABLE PATTERN MATCHING

CROSS-REFERENCE TO RELATED APPLICATION

This application claims the benefit of U.S. Provisional Patent Application 61/292,866, filed Jan. 7, 2010, which is incorporated herein by reference.

FIELD OF THE INVENTION

The present invention relates generally to pattern matching, and specifically to efficient pattern matching techniques based on finite automata.

BACKGROUND OF THE INVENTION

Pattern matching algorithms are widely used in a variety of network communication applications. For example, Intrusion Detection Systems (IDS) use pattern matching in deep packet inspection, for purposes such as detecting known signatures of malicious content.

A common approach used at present in this type of pattern matching is the Aho-Corasick algorithm, which was first described by Aho and Corasick in "Efficient String Matching: An Aid to Bibliographic Search," *Communications of the ACM 6*, pages 333-340 (1975), which is incorporated herein by reference. The Aho-Corasick algorithm uses a deterministic finite automaton (DFA) to represent the pattern set. The input stream is inspected symbol by symbol by traversing the DFA: Given the current state and the next symbol from the input, the DFA indicates the transition to the next state. Reaching certain states of the DFA indicates to the IDS that the input may be malicious and should be handled accordingly.

Basic implementations of the Aho-Corasick algorithm require a large memory, since the DFA contains one transition rule for each pair of a current state and a next symbol. There have therefore been a number of attempts to compress such DFAs. For example, U.S. Patent Application Publication 2008/0046423, whose disclosure is incorporated herein by reference, describes a method for multi-character multi-pattern matching using a compressed DFA, with each transition based on multiple characters of the input stream. Each state of the compressed DFA represents multiple consecutive states of the original DFA, and each transition between the states of the compressed DFA is a combination of all of the transitions between the multiple consecutive states of the original DFA. The method can be implemented using a Ternary Content-Addressable Memory (TCAM) to store the transitions of the compressed DFA and compare the transitions with multiple characters of an input stream at a time to detect patterns in the input stream.

SUMMARY OF THE INVENTION

Embodiments of the present invention that are described hereinbelow provide methods, apparatus and software for pattern matching using an efficient, compact representation of a finite automaton.

There is therefore provided, in accordance with an embodiment of the present invention, a method for processing data, which includes encoding a finite automaton, including states and transitions between the states that express a plurality of predefined patterns, by grouping the states of the automaton into sets according to a common property shared by the states in each set, and assigning codes to the states according to the grouping. The codes are stored in an electronic memory, along with rules that are associated with the patterns. The automaton is traversed in order to identify one or more of the patterns in an input sequence of data elements by iteratively reading out the codes from the memory responsively to the data elements and to the codes that have been previously read out. Upon identifying a given pattern in the input sequence, an associated action is performed.

Typically, the states have labels that are defined by the transitions of the automaton, and the common property includes a suffix that is common to the labels of all the states in each set. In a disclosed embodiment, the states are assigned to the sets such that the common suffix of the labels of all the states within each set is a label of another state without the last symbol of the label.

In some embodiments, assigning the codes includes building a tree including nodes corresponding to the sets and edges connecting the nodes, and assigning the codes to the nodes according to a structure of the tree. The tree may be arranged so as to minimize a number of bits required to encode the states. Additionally or alternatively, assigning the codes includes assigning respective bit values to the edges, and computing a respective code for each state by concatenating the bit values along the edges leading to a set of minimal size that contains the state.

In a disclosed embodiment, each rule is indicative of a transition to a next state of the finite automaton, and codes are chosen so that there is exactly one rule corresponding to each next state.

In some embodiments, assigning the codes includes allocating the codes according to the sets so that the codes of the states in each set have a respective common prefix. Typically, storing the codes along with the rules includes storing in the memory, for each rule, the respective common prefix and an indication of a next data element associated with a transition corresponding to the rule, and reading out the codes includes finding a longest matching prefix in the memory for a current state code and data element. The electronic memory may include an associative memory for storing the common prefix and the indication of the next data element.

In one embodiment, encoding the finite automaton includes defining multiple strides, each stride including a respective sequence of transitions in the finite automaton, such that a number of the transitions in the respective sequence is variable among the strides, and assigning state codes to the states and stride codes to the strides, and the rules are defined over both the state codes and the stride codes.

In a disclosed embodiment, the patterns include respective series of data symbols, and the finite automaton includes a deterministic finite automaton that is constructed from the series using an Aho-Corasick algorithm. In an alternatively embodiment, the patterns are represented by a regular expression, and the finite automaton corresponds to the regular expression.

In some embodiments, the input sequence includes a series of data symbols in a data packet received from a network, and performing the associated action includes deciding on a disposition of the packet responsively to the pattern identified in the packet.

There is also provided, in accordance with an embodiment of the present invention, apparatus for processing data, including a memory, which is configured to store codes obtained by encoding a finite automaton, including states and transitions between the states that express a plurality of predefined patterns, and to store rules that are associated with the patterns. The finite automaton is encoded by grouping the states of the automaton into sets according to a common property shared by the states in each set, and assigning codes to the states according to the grouping. A processor is configured to traverse the automaton in order to identify one or more of the patterns in an input sequence of data elements by iteratively reading out the codes from the memory responsively to the data elements and to the codes that have been previously read out, and upon identifying a given pattern in the input sequence, to perform an associated action.

There is additionally provided, in accordance with an embodiment of the present invention, a computer software product, including a computer-readable medium in which program instructions are stored, which instructions, when read by a computer, cause the computer to encode a finite automaton, including states and transitions between the states that express a plurality of predefined patterns, by grouping the states of the automaton into sets according to a common property shared by the states in each set, and assigning codes to the states according to the grouping, and to store the codes in an electronic memory, along with rules that are associated with the patterns. The automaton is traversable in order to identify one or more of the patterns in an input sequence of data elements by iteratively reading out the codes from the memory responsively to the data elements and to the codes that have been previously read out, such that upon identifying a given pattern in the input sequence, an associated action is performed.

The present invention will be more fully understood from the following detailed description of the embodiments thereof, taken together with the drawings in which:

BRIEF DESCRIPTION OF THE DRAWINGS

FIGS. 5-12 contain pseudocode listings representing algorithms used in implementing methods of pattern matching, in accordance with embodiments of the present invention.

DETAILED DESCRIPTION OF EMBODIMENTS

Overview

Figure 1:
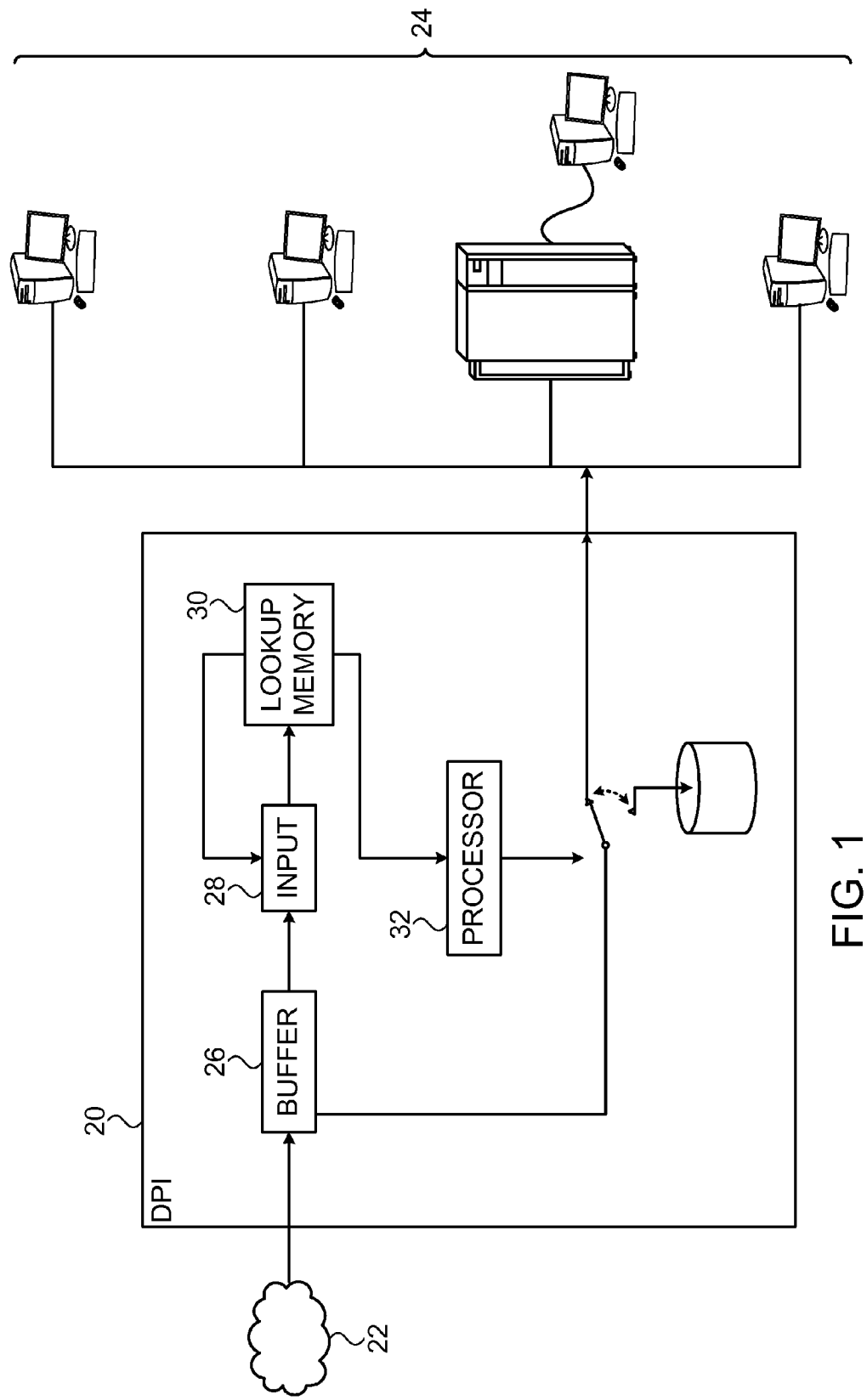
FIG. 1 is a block diagram that schematically illustrates apparatus for deep packet inspection (DPI), in accordance with an embodiment of the present invention.

Embodiments of the present invention that are described hereinbelow provide memory-efficient techniques for encoding and processing finite automata, and particular automata whose states and transitions correspond to a set of predefined patterns. These techniques are particularly useful in implementing the sort of deterministic finite automata (DFA) that are constructed by the Aho-Corasick algorithm, for use in detecting patterns in an input sequence of symbols. Although the embodiments described below focus on this class of DFA, however, the principles of the present invention may also be applied, mutatis mutandis, in encoding and processing other types of pattern definitions, such as regular expressions, as well as other types of finite automata.

In the disclosed embodiments, a finite automaton is encoded by grouping the states of the automaton into sets according to a common property shared by the states in each set, and assigning codes to the states according to the grouping. These codes are stored in an electronic memory, along with rules that are associated with the patterns represented by the automaton (and are thus indicative of transitions among the states). Specifically, the states may be grouped and the rules defined so that there is exactly one rule that leads to each of the next states. This sort of grouping and coding permits the finite automaton to be represented and stored far more compactly than in classical approaches, which typically require one rule per transition and can generally include many transitions to each state (for example, an average of 256 transitions to a state in basic implementations of the Aho-Corasick algorithm).

A processor receiving an input sequence of data elements, such as data symbols in a packet, traverses the automaton in order to identify the corresponding patterns in the input sequence. This traversal is carried out by iteratively reading out the state codes from the memory, using the current state code and the next data element as the input key. When a given pattern is identified, the processor performs an associated action, such as deciding on the disposition of the packet—to block it, pass it to quarantine, record its occurrence, or to pass it through to its destination.

In an embodiment that is described in greater detail below, the states of the automaton have suffixes that are defined by the transitions of the automaton, and the states are grouped according to a common suffix (specifically the longest common suffix) shared by the states in each set. These suffixes are used building a balanced tree, comprising nodes corresponding to the sets of states and edges connecting the nodes. Codes are assigned to the nodes according to the structure of the tree, using respective bit values that are assigned to the edges. The respective code for each state is then computed by concatenating the bit values along the edges leading to the set that contains the state. The rules are encoded in a similar fashion. The tree can be arranged in such a way so as to minimize a number of bits required to encode the states.

A result of this sort of suffix tree arrangement is that the codes of the states in each set have a respective common prefix. The memory entry for each rule is indexed by this common prefix along with an indication of the next data element in the input sequence, which are together associated with the transition corresponding to the rule. Thus, the rules, including the next state code, are read out of the memory by finding the longest matching prefix to the current state code and data element. This sort of lookup scheme can be implemented efficiently in associative memory, such as ternary content-addressable memory (TCAM).

Formally and generally, the above DFA is a 5-tuple structure $\langle S,\Sigma,s_0,F,\delta \rangle$, wherein $S$ is the set of states, $\Sigma$ is the alphabet, $s_0 \in S$ is the initial state, $F \subseteq S$ is the set of accepting states, and $\delta: S \times \Sigma \mapsto S$ is the transition function. Let a rule of the DFA be $\langle s_i, x, s_j \rangle$, wherein $x \in \Sigma$ and $s_i, s_j \in S$. The rule $\langle s_i, x, s_j \rangle$ is in the DFA rule set if and only if $\delta(s_i, x) = s_j$. When the current state $s' \in F$, it means that a pattern has been found in the input sequence.

In the disclosed embodiments, the automaton is encoded by creating a prioritized list of rules, wherein each rule has the structure $\langle S', W', s_j \rangle$, and $S' \subseteq S, W' \subseteq \Sigma^*$ (wherein the "*" superscript operator indicates concatenation of a finite number of symbols to words). When the input sequence of symbols is $w'$ and the current state is $s'$, the automaton will switch to the next state $s_j$ of the highest priority rule $\langle S', W', s_j \rangle$ for which $s' \in S'$ and $w' \in W'$. The operation of the compressed automaton that is encoded in this manner is equivalent to that of the original automaton, i.e., if the input sequence is w'=x, y,z . . . and the current state is s', the automaton will switch to the next state $s_j$ of the highest priority $\langle S',W',s_j \rangle$ of which s'∈S' and w'∈W' iff $\delta(\delta(\delta(s',x),y),z) \ldots ) = s_j$ in the original automaton.

When a TCAM is used in storing the rules, the rules are encoded using the ternary alphabet $\langle 0,1,* \rangle$ and are stored in order of their priority. The symbol "*" means "don't care," i.e., that the corresponding bit position in the input key may be either a 1 or a 0 in order to match this symbol.

In the encoding scheme that is described below, the sets of states in S' have the properties that any pair of the sets is either disjoint, or one of the sets is contained the other, and that the priority of the rules is in inversely proportional to the order of the size of the sets (i.e., from the smallest set to the biggest). The sets are coded in such a way that, for every two sets $S_i'$ and $S_j'$:

$S_i'$ contains $S_j'$ iff code $(S_i')$ is a prefix of code $(S_j')$; and

The encoding of any given state $s_i'$ is such that if $S_i'$ is the smallest set that contains $s_i'$, then code $(S_i')$ will be the longest match to code $(s_i')$ relative to all other code $(S_j')$ for $S_j' \ne S_i'$.

System Description

FIG. 1 is a block diagram that schematically illustrates apparatus 20 for deep packet inspection (DPI), in accordance with an embodiment of the present invention. This apparatus implements the methods of DFA encoding and traversal that are mentioned above, and which are described in greater detail hereinbelow. Apparatus 20 may serve, for example, as an intrusion detection system (IDS), which inspects and filters packets transmitted from a public network 22 to a private network 24. In this capacity, the apparatus uses a DFA model, such as the type of model provided by the Aho-Corasick algorithm, to check incoming data packets based on a predefined set of patterns, and to decide on the disposition of packets depending upon whether the sequences of symbols (typically bytes) that they contain match any of the patterns.

Incoming packets are held in a buffer 26, from which they are read out symbol by symbol to an input 28 of a lookup memory 30, which contains state codes and rules of the DFA. Each input 28 comprises the state code of the current state of the DFA together with the next symbol read from buffer 26. The rules have the form:

| Input | Output |
|---|---|
| Set of current states    Next symbol | Next state |

Based on the given input, memory 30 finds the matching set of current states and symbol, and outputs the code of the corresponding next state. The next-state determination is used in generating the next input 28, as well as indicating whether the sequence of symbols has matched any of the patterns of interest. Each match indication may be accompanied by an action to be applied to the packet containing the pattern, such as allowing the packet to pass to its destination, blocking or otherwise limiting the transmission of the packet, and possibly also logging the occurrence of the pattern. A processor 32 receives these actions from memory 30 and applies them to the packets in buffer 26.

Lookup memory 30 may be implemented in a variety of different ways, all of which are considered to be within the scope of the present invention. For example, the lookup memory may comprise one or more IP-lookup chips, which are commonly used in routers to look up routing rules for incoming packets based on their Internet Protocol (IP) addresses. In apparatus 20, however, the lookup key is input 28, based on the sequence of symbols in the packet (rather than the IP address), and the rules indicate the next state code and packet disposition, as explained above.

Alternatively or additionally, lookup memory 30 may comprise a TCAM, which contains ternary coding of the matching rules, and a random access memory (RAM), such as a static RAM (SRAM), containing the next state code and packet disposition for each matching rule. The TCAM entries are stored in order of priority, wherein the rules are prioritized according to prefix length, from longest to shortest. For each input 28, the TCAM outputs the index of the highest-priority entry that is matched by the input. The lookup memory outputs the SRAM entry corresponding to this index.

For network processing applications, such as intrusion detection, it is generally desirable that apparatus 20 operate at wire speed, with throughput equal to the rate of arrival of packets from network 22. There are lookup memory devices, such as TCAM chips, that are able to meet this throughput requirement but still have substantial latency, meaning that many clock cycles elapse between each input and the next state code output. To address this latency issue, buffer 26 may process a group of incoming packets in parallel in a round robin, passing a byte from each packet to input 28 in turn when the next state code for that packet is output by lookup memory 30. When processing of a given packet is completed, processor 32 passes the packet on toward its destination or takes some other appropriate action, and another packet from buffer 26 can enter the round robin.

Alternatively, each packet can be divided into chunks, whose number is determined by the throughput-latency product of the chip. Then, when processing each byte of each chunk, the output of the previous byte in the chunk is available and can be used to compute the next byte of the chunk. In order to make sure patterns that span multiple chunks are detected, some overlapping between the chunks is required.

The power consumption of a TCAM chip in lookup memory 30 may be reduced by taking advantage of the fact that TCAM vendors provide a mechanism that enables selectively addressing smaller portions of the TCAM at a time, typically in blocks of consecutive entries. For this purpose, the rules of the encoded DFA may be partitioned among the blocks, for example, according to their next-symbol field. Since the blocks are of fixed size, it may be desirable to balance the number of rules among the blocks according to the number of rules corresponding to each symbol in the alphabet. The lookup for any given input 28 will then be limited to the block or blocks that contain the next-symbol indicated by the input. This method can also be used to reduce the number of bits in each TCAM entry, since it alleviates the need to encode all the bits of the next symbol. For example, if the TCAM is divided into sixty-four different blocks and the alphabet contains 256 symbols, only two bits (rather than eight) may be required to represent the next symbol within each block.

The logical functions performed by apparatus 20 (including the decision functions of processor 32 and control of buffer 26 and lookup memory 30) are typically carried out by suitable digital logic circuits, which may comprise hard-wired and/or programmable logic components. Alternatively, at least some of these functions may be implemented in software executed by a general-purpose computer processor with suitable interfaces. This software may be downloaded to the processor in electronic form, over a network, for example. Alternatively or additionally, the software may be stored on tangible computer-readable media, such as optical, magnetic, or electronic memory.

Encoding of Deterministic Finite Automata

Figure 2:
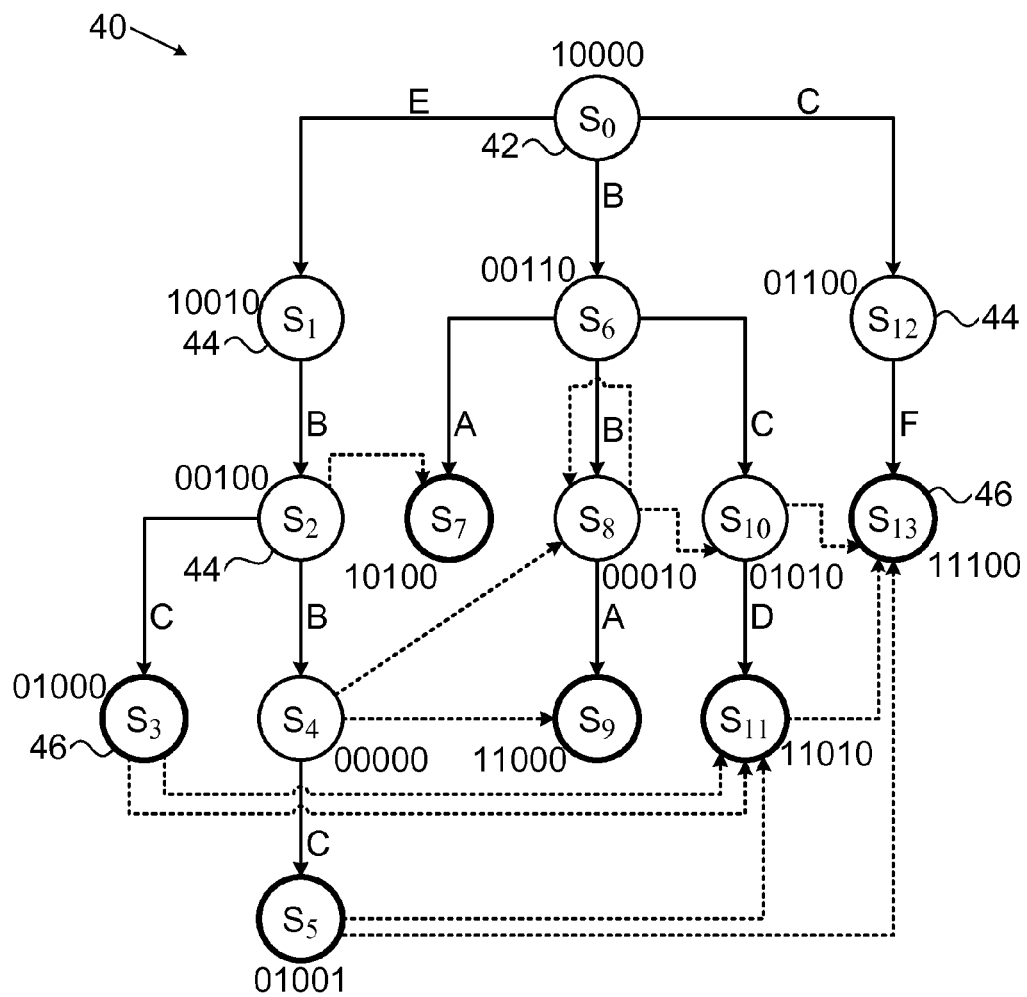
FIG. 2 is a graph that schematically illustrates a DFA, with encoding in accordance with an embodiment of the present invention.

FIG. 2 is a graph that schematically illustrates a DFA 40, in accordance with an embodiment of the present invention. The graph comprises a root node 42, intermediate nodes 44, and leaves 46, all corresponding to states of the DFA, with edges between the nodes corresponding to transitions between the states. The states are marked with names $s_1, s_2, \ldots, s_{13}$, in arbitrary serial order, as well as with five-bit codes, whose derivation is explained hereinbelow. The transitions are invoked depending on the value of the next symbol when the DFA is in a given state. The next symbol leading to each state (from an alphabet of five symbols: A, B, C, D, e) is marked next to the corresponding node. Although DFA 40 uses only this limited alphabet, with a small number of brief patterns, the method described below may equally be applied to large, complex DFAs, with alphabets of 256 symbols, for example, and rules that are tens or hundreds of symbols in length.

DFA 40 is an Aho-Corasick representation of the pattern set: CF, BCD, BBA, BA, EBBC, and EBC, which may occur in sequences of the symbols in the alphabet. The DFA is constructed in two phases. First, the algorithm builds a trie of the pattern set: All the patterns are added from root 42 as chains, wherein the transition to each state is invoked by a single symbol, as noted above. When patterns share a common prefix, they also share the corresponding set of states in the trie. Edges belonging to these patterns, also known as "forward transitions," are marked with solid lines in FIG. 2.

In the second phase, additional edges are added to the trie, marked by dashed lines in the figure. These edges, also known as "cross transitions," correspond to situations in which the input sequence does not follow the current chain in the trie (i.e., the next symbol is not an edge of the trie) and therefore cause the DFA to transit to a different chain. In such cases, the edge leads to a state corresponding to a prefix of another pattern, which is equal to the longest suffix of the previously-matched symbols. "Failure transitions," leading back to root node 42, and "restartable transitions," leading to the first tier of nodes 44 following the root, are omitted from FIG. 2 for the sake of readability.

The following definitions are used in reference to states s∈S: The depth of a state s is the length (in edges) of the shortest path between s and $s_0$. The label of a state s is the concatenation of the symbols along the edges of the shortest path between $s_0$ and s. For every i≦depth(s), suffix (s,i)∈Σ* is the suffix of length of label(s), while prefix (s,i)∈Σ* is the prefix of length i of label(s). The code of a state s is a unique number that is associated with the state, i.e., it is the number that encodes the state. As explained early, the encoding scheme that is described in this patent application facilitates a particularly compact coded representation of the Aho-Corasick DFA and of other finite automata with similar properties.

The following properties are inherent in the Aho-Corasick DFA and ensure that the rules of the DFA will be captured correctly by the present encoding scheme:
1. Given a set of patterns and an input string, the DFA accepts the input string if one of the patterns exists in the input. When a match occurs, the DFA is also able to trace back which pattern (or patterns) were matched by the input.
2. All the incoming transitions to a given state are labeled with the same symbol (as indicated, for example, by the symbol appearing next to each node in FIG. 2).
3. There are no redundant states in the DFA. This property implies that every state has a path of forward transitions to an accepting state (corresponding to leaves 46 in FIG. 2).
4. Any given input symbol leads to exactly one state, since the automaton is deterministic.

Properties 1 and 3 imply the following lemmas, which can be used to prove the correctness of the encoding scheme:
1. For any state s of depth d, the last d symbols on any path from $s_0$ to s are equal to the last d symbols in label(s).
2. Cross-transitions from a state s∈S with a symbol x∈Σ are always to the state $s_1$ whose label is the longest possible suffix of label(s)x.

Figure 3:
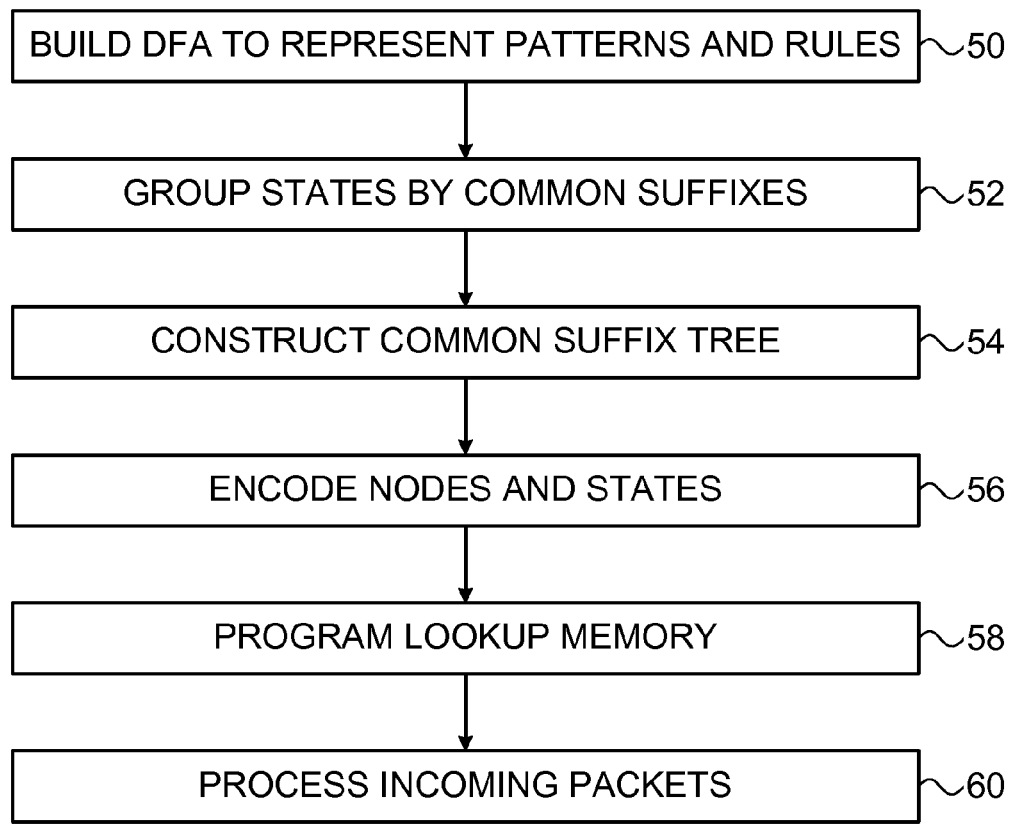
FIG. 3 is a flow chart that schematically illustrates a method for pattern matching using an encoded DFA, in accordance with an embodiment of the present invention.

FIG. 3 is a flow chart that schematically illustrates a method for pattern matching using an encoded DFA, in accordance with an embodiment of the present invention. The steps involved in encoding the DFA may be carried out, for example, by processor 32 or another suitable processor in apparatus 20 or by a separate computer processor operating off-line, which then downloads the state codes and rules to the apparatus. Although this method refers specifically to encoding of an Aho-Corasick DFA, the method may alternatively be applied to finite automata of other types. Some examples and adaptations of the method to operate with other types of finite automata are described below.

The processor receives a set of patterns and rules, and builds the corresponding DFA, at a DFA construction step 50. This step may follow the Aho-Corasick algorithm described above, as is known in the art. The processor then groups the states according to common suffixes, at a state grouping step 52. For this purpose, the processor calculates two parameters for each state: its common suffix (CS) and its longest common suffix (LCS). These parameters may be calculated for each state in linear time using the algorithm presented in FIG. 5. If a state has only one incoming transition, it will not be grouped, and therefore its CS value is set to ⊥, signifying the empty word. In the example shown in FIG. 2, $CS(s_{13})$=C, which is the common suffix of $s_3, s_5, s_{10}$ and $s_{12}$. $CS(s_{11})$=BC, which is the common suffix of $s_3, s_5$ and $s_{10}$. On the other hand, $CS(s_5)$=⊥ since $s_5$ has only one incoming transition.

LCS(s) is the longest CS(s') such that s has outgoing edges to s'. The prefix bytes in a state label that are not part of its LCS will not affect which rule matches the state. In the example shown in FIG. 2, $LCS(s_5)$=BC, since $s_5$ has outgoing edges to $s_{11}$ and $s_{13}$, with $CS(s_{11})$=BC, while $CS(s_{13})$=C. The relation between the CS and LCS parameters is expressed by the following lemma: For every state s∈S, LCS(s) is a suffix of label(s); and for every state s'∈S for which there is a symbol x∈Σ such that δ(s,x)=s', CS (s') is a suffix of LCS(s). In step 52, the states of the DFA are grouped in sets, wherein each set contains all the states that share the same LCS.

Figure 4:
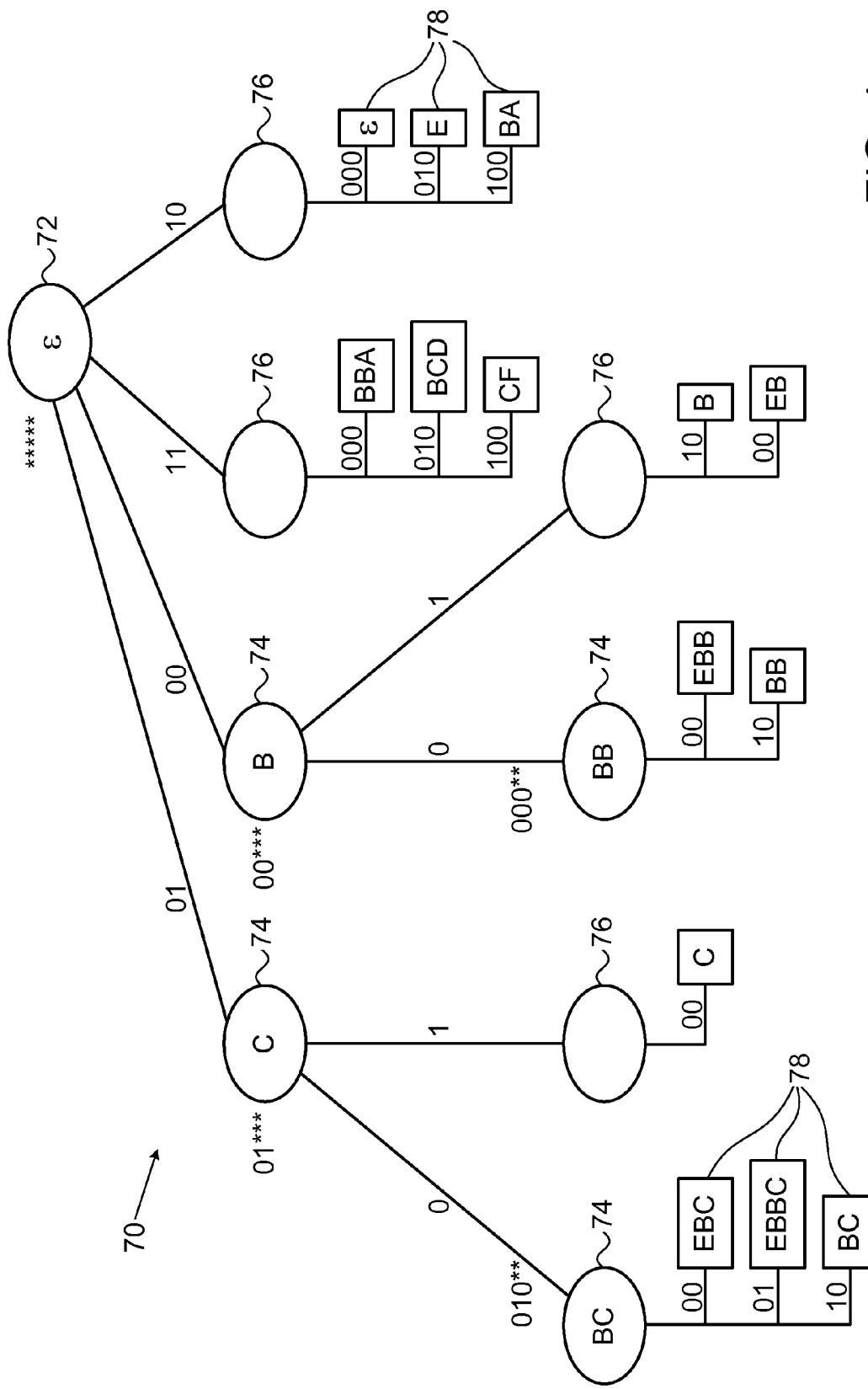
FIG. 4 is a graph that schematically illustrates a tree used in encoding a DFA, in accordance with an embodiment of the present invention.

Reference is now made to FIG. 4, which is a graph that schematically illustrates a common suffix tree 70 corresponding to DFA 40 (FIG. 2), in accordance with an embodiment of the present invention. Based on the grouping of the states at step 52, the processor builds this sort of common suffix tree in order to determine the codes that are to be applied to the states, at a tree building step 54. The process of building the common suffix tree is presented in pseudocode form in FIG. 6.

Common suffix tree 70 comprises a root node 72 and internal nodes 74 corresponding to the different LCS values, such that for every two such LCS values $l_1,l_2$∈L (wherein L is the set of all LCS values), $l_1$ is an ancestor of $l_2$ if and only if $l_1$ is a suffix of $l_2$. In building tree 70, it is sufficient to consider only LCS values, since the set L contains all the possible CS values.

For every internal node 74 in common suffix tree 70, the processor adds one or more connecting nodes 76, so that the total number of the children of the internal node is a power of two and there is at least one such connecting node. The processor then links states 78 of DFA 40 to tree 70. (For consistency with the suffix notation, states 78 are marked in FIG. 4 with their labels, based on the sequences of symbols shown in FIG. 2. Thus, for example, state "EBC" in FIG. 4 refers to state $s_3$, EBBC refers to $s_5$, and so forth.) Each state 78 is linked to the node 74 that corresponds to its LCS: If the node is a leaf of tree 70, the state is linked directly to the node; otherwise, the state is linked to one of connecting nodes 76, such that the number of states linked to sibling connecting nodes is balanced. The main purpose of these connecting nodes is to balance the states to the extent possible so that the tree can be encoded with a relatively small number of bits.

The processor uses common suffix tree 70 in encoding the nodes 74 and states 78 that appear in the tree, at an encoding step 56. These state codes are then used in encoding the rules of the DFA. The operations performed at step 56 are presented in pseudocode form in FIG. 7.

The processor beings the coding process by finding the code width w, which is the number of bits required to encode the entire tree. The edges of tree 70 are encoded by enumerating over all sibling edges (edges that originate from the same node): Each edge is encoded with its binary ordinal number and a code width of [log n+1] bits, wherein n is the number of sibling edges. Thus, for example, the four edges emanating from root node 72 in FIG. 4 are numbered 00, 01, 10, 11. Then each node 74 is encoded using the concatenation of the edge codes of the path between root node 72 and the node. The CS of each state s is encoded by the code of the node that corresponds to CS(s), which is padded with * symbols to reach the code width w, as indicated in FIG. 4. Each state is encoded using the code of its corresponding node 74 or 76 in common suffix tree 70, expanded with additional bits up to width w. Thus, for example, state $s_4$ with label EBB receives code 00000, state $s_8$ with label BB receives code 00001, and so forth, as indicated in FIG. 2.

After encoding states 78 in this manner, the processor can rewrite the rules in compressed form by combining all the rules that share the same next state $s \neq s_0$ into a single rule. Assuming x to be the symbol on all the incoming edges to s (in accordance with Property 2 above), the compressed single rule for s will have the form ⟨ code(CS(s)),x,code(s)⟩ as long as there is more than one such edge; otherwise, the rule is encoded as ⟨ code(s'),x,code(s)⟩, wherein s' is the origin of the single edge leading to s. For the root state $s_0$, the processor adds the default rule ⟨ *****,*,code($s_0$)⟩ (with w "*" symbols corresponding to the current state in the first field of the rule). During traversal of the DFA, the next transition to be taken from state s' is determined by searching the rule set with code (s') to find the longest matching prefix. The compressed set of rules for DFA 40 is listed below:

TABLE I

| | ENCODED RULES | | |
|---|---|---|---|
| | CURRENT | SYM | NEXT STATE |
| 1 | 00000 | C | 01001 ($s_5$) |
| 2 | 00100 | C | 01000 ($s_3$) |
| 3 | 00100 | B | 00000 ($s_4$) |
| 4 | 10010 | B | 00100 ($s_2$) |
| 5 | 010** | D | 11010 ($s_{11}$) |
| 6 | 000** | A | 11000 ($s_9$) |
| 7 | 01*** | F | 11100 ($s_{13}$) |

TABLE I-continued

| | ENCODED RULES | | |
|---|---|---|---|
| | CURRENT | SYM | NEXT STATE |
| 8 | 00*** | C | 01010 ($s_{10}$) |
| 9 | 00*** | B | 00010 ($s_8$) |
| 10 | 00*** | A | 10100 ($s_7$) |
| 11 | ***** | E | 10010 ($s_1$) |
| 12 | ***** | C | 01100 ($s_{12}$) |
| 13 | ***** | B | 00110 ($s_6$) |
| 14 | ***** | * | 10000 ($s_0$) |

The encoded rules are programmed into lookup memory (FIG. 1), in a programming step 58. Apparatus 20 applies these rules, symbol by symbol, to incoming packets, as described above, in a packet processing step 60. Alternatively, a compressed DFA, as described above, may be used in other applications that involve detecting patterns in input strings of various sorts.

Although the approach described above minimizes the number of rules in the encoded DFA, this minimization is typically achieved at the cost of increasing the number of bits used to encode each state. For some applications, it may be desirable to minimize the total memory required by the encoded DFA, i.e., the product of the number of rules by the total number of bits required to encode a rule. For this purpose, it may be preferable in some cases to use fewer bits per state code, even at the cost of slightly increasing the number of rules. For example, in tree 70, if one of the three states under node BC is shifted over to the adjacent connecting node 76, it will become possible to encode all of the states of the DFA with only four bits, rather than five as in the pictured scheme. The cost will be an additional rule, which is required in order to handle the shifted state explicitly rather than as part of its LCS set.

One way to reduce memory requirements systematically is to encode as a single rule only those sets of rules whose next state is at a depth no greater than D, wherein D is an adjustable parameter of the algorithm. In experimental work, the inventors have found that most of the rules in a typical DFA are due to transitions to states with small depth, implying that compressing these rules might be sufficient to achieve good compression. At the same time, even though only a small fraction of the rules correspond to states with large depth, these latter rules can increase the code width significantly due to the structure of the common suffix tree. The optimal D for total memory requirement minimization can be found simply by checking the size of the compressed rule set for different possible D values and choosing the optimal one.

FIG. 8 presents an algorithm in pseudocode form for constructing a common suffix tree that is truncated at a given depth D. Nodes that appear in the original, untruncated common suffix tree at depth greater than D are connected to their ancestors at depth D if and only if they are state nodes. All other nodes are omitted. (The depth is counted in nodes, giving an empty structure for D=0.) The same encoding algorithm, as described above, is then applied to the truncated tree. The tree in this case is "fatter" and thus can be encoded with a smaller code width. Only those rules for which the CS of the next state s appears in the truncated common suffix tree are now compressed. For all other rules, the corresponding transitions are encoded explicitly.

Speed Enhancement Using Multi-Symbol Lookup

One way to increase the speed of pattern matching is to perform the lookup operations on sequences of multiple characters (referred to as words or "strides") that are taken from the input simultaneously. If each such stride has a predetermined size k, lookup performance may potentially be boosted by a factor of k. To avoid skipping over accepting states, however, an embodiment of the present invention uses variable-size strides (of length less than one word) for transitions that go to accepting states. For states s whose depth d is smaller than k, there can be several different words of size k that go to s, although these words share the same suffix of length d. These additional features of the DFA are taken into account when grouping the states for encoding purposes (as at step 52 in FIG. 3). An algorithm for this sort of grouping with strides is listed in pseudocode form in FIG. 9.

The algorithm shown in FIG. 9 calculates a family F of sets of states $S_s$. For any two sets in F, either one set contains the other, or the sets are disjoint. For coding purposes, each state s is attached to the minimal-size set $S_s \in F$ for which $s \in S_s$. The sets $S_s$ are then arranged in a tree (i.e., a tree of the sort defined above, in which a set $S_1$ is an ancestor of $S_2$ in the tree if and only if $S_1$ contains $S_2$), which can be encoded using the methods described above.

This tree of sets is used in converting the original rules to a compressed form. For each non-accepting state s, the rule whose next state is s is given by the code of $S_s$ in the current state field, the suffix of length k of the label (as defined above) of s as the symbol field, padded with * to the left in case the label is shorter than k. For accepting states, we obtain k rules, one for each stride size to the accepting state. (In such a case, the symbol field is padded with * to the right.) The rules are prioritized according to two criteria: The primary criterion is the size of the stride, wherein the shorter the stride, the higher is its corresponding priority. Then, within each stride size, the rules are prioritized according to the length of the prefix in their current state field, wherein longer prefixes have higher priority.

Details of this encoding method are presented as pseudocode in FIG. 10.

Encoding and Evaluating Regular Expressions

Although the examples described above relate to a DFA constructed using an Aho-Corasick-type algorithm, similar techniques may be applied in encoding a DFA created to detect a regular expression. Such a DFA may be constructed using methods known in the art, as described, for example, by Hoperoft and Ullman, in Chapter 2 of *Introduction to Automata Theory, Languages, and Computation* (Addison-Wesley, 1979), which is incorporated herein by reference. In contrast to the Aho-Corasick-type DFA, however, the DFA constructed from a regular expression does not generally support trace-back (property 1 described above), and therefore does not satisfy the two lemmas listed above with respect to all the cross-edges of the DFA.

To address this issue, the edges (transitions) of the regular-expression DFA are divided into two classes: Edges corresponding to a failure in the matching process can be represented by a single prefix for each incoming state s as in the methods described above (since lemma 2 holds with respect to these edges). All other edges of the DFA are coded explicitly. An algorithm for grouping the states of the DFA under these conditions is shown in pseudocode form in FIG. 11. This algorithm aggregates the edges that can be compressed, and groups the states that have more than one such edge, in a manner similar to that in the algorithm of FIG. 5 (step 52 in FIG. 3).

Following this state grouping, a common suffix tree is constructed as in step 54, and the states and rules are then encoded in a manner similar to step 56, with the addition of explicit rules for cross-edges that cannot be compressed. The modified encoding algorithm for this purpose is shown in pseudocode form in FIG. 12. The modifications of the algorithm that are described above for reducing memory requirements may be applied here, as well.

Although the above embodiments relate to specific types of DFAs and a specific application environment, the principles of the present invention may similarly be applied, mutatis mutandis, in encoding finite automata of other types, as well as in encoding DFAs and other finite automata by grouping states according to common properties other than the common-suffix properties defined above. For example, the methods described above may be adapted to encode regular expressions corresponding to non-deterministic finite automata (NFA) that have also $\epsilon$-transitions (i.e., transitions that do not consume characters of the input). In this case, the states of the NFA can be grouped to $\epsilon$-connected components (that is, state A and state B are in the same set if there is a path from A to B consisting of $\epsilon$-transitions only).

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for processing data, comprising:
    encoding a finite automaton, comprising states and transitions between the states that express a plurality of predefined patterns and labels of states defined by the transitions of the automaton, by grouping the states of the automaton into sets according to a common property comprising a suffix that is common to the labels of all the states in each set, and assigning codes to the states according to the grouping so that the codes of the states in each set have a respective common prefix,
    wherein the common suffix of the labels of all the states within each set is a label of another state without a last symbol of the label;
    storing the codes in an electronic memory, along with rules that are associated with the patterns;
    traversing the automaton in order to identify one or more of the patterns in an input sequence of data elements by iteratively reading out the codes from the memory responsively to the data elements and to the codes that have been previously read out; and
    upon identifying a given pattern in the input sequence, performing an associated action.

2. The method according to claim 1, wherein assigning the codes comprises building a tree comprising nodes corresponding to the sets and edges connecting the nodes, and assigning the codes to the nodes according to a structure of the tree.

3. The method according to claim 2, wherein building the tree comprises arranging the tree so as to minimize a number of bits required to encode the states.

4. The method according to claim 2, wherein assigning the codes comprises assigning respective bit values to the edges, and computing a respective code for each state by concatenating the bit values along the edges leading to a set of minimal size that contains the state.

5. The method according to claim 1, wherein each rule is indicative of a transition to a next state of the finite automaton, and wherein assigning the codes comprises choosing the codes so that there is exactly one rule corresponding to each next state.

6. The method according to claim 1, wherein storing the codes along with the rules comprises storing in the memory, for each rule, the respective common prefix and an indication of a next data element associated with a transition corresponding to the rule, and wherein reading out the codes comprises finding a longest matching prefix in the memory for a current state code and data element.

7. The method according to claim 6, wherein the electronic memory comprises an associative memory for storing the common prefix and the indication of the next data element.

8. The method according to claim 1, wherein encoding the finite automaton comprises defining multiple strides, each stride comprising a respective sequence of transitions in the finite automaton, such that a number of the transitions in the respective sequence is variable among the strides, and assigning state codes to the states and stride codes to the strides, and wherein the rules are defined over both the state codes and the stride codes.

9. The method according to claim 1, wherein the patterns comprise respective series of data symbols, and wherein the finite automaton comprises a deterministic finite automaton that is constructed from the series using an Aho-Corasick algorithm.

10. The method according to claim 1, wherein the patterns are represented by a regular expression, and wherein the finite automaton corresponds to the regular expression.

11. The method according to claim 1, wherein the input sequence comprises a series of data symbols in a data packet received from a network, and wherein performing the associated action comprises deciding on a disposition of the packet responsively to the pattern identified in the packet.

12. Apparatus for processing data, comprising:
a memory, which is configured to store codes obtained by encoding a finite automaton, comprising states and transitions between the states that express a plurality of predefined patterns and labels of states defined by the transitions of the automaton, and to store rules that are associated with the patterns, wherein the finite automaton is encoded by grouping the states of the automaton into sets according to a common property comprising a suffix that is common to the labels of all the states in each set, and assigning codes to the states according to the grouping so that the codes of the states in each set have a respective common prefix,
wherein the common suffix of the labels of all the states within each set is a label of another state without a last symbol of the label; and
a processor, which is configured to traverse the automaton in order to identify one or more of the patterns in an input sequence of data elements by iteratively reading out the codes from the memory responsively to the data elements and to the codes that have been previously read out, and upon identifying a given pattern in the input sequence, to perform an associated action.

13. The apparatus according to claim 12, wherein assigning the codes comprises building a tree comprising nodes corresponding to the sets and edges connecting the nodes, and assigning the codes to the nodes according to a structure of the tree.

14. The apparatus according to claim 13, wherein building the tree comprises arranging the tree so as to minimize a number of bits required to encode the states.

15. The apparatus according to claim 13, wherein assigning the codes comprises assigning respective bit values to the edges, and computing a respective code for each state by concatenating the bit values along the edges leading to a set of minimal size that contains the state.

16. The apparatus according to claim 12, wherein each rule is indicative of a transition to a next state of the finite automaton, and wherein assigning the codes comprises choosing the codes so that there is exactly one rule corresponding to each next state.

17. The apparatus according to claim 12, wherein the memory stores, for each rule, the respective common prefix and an indication of a next data element associated with a transition corresponding to the rule, and wherein reading out the codes comprises finding a longest matching prefix in the memory for a current state code and data element.

18. The apparatus according to claim 17, wherein the electronic memory comprises an associative memory for storing the common prefix and the indication of the next data element.

19. The apparatus according to claim 12, wherein encoding the finite automaton comprises defining multiple strides, each stride comprising a respective sequence of transitions in the finite automaton, such that a number of the transitions in the respective sequence is variable among the strides, and assigning state codes to the states and stride codes to the strides, and wherein the rules are defined over both the state codes and the stride codes.

20. The apparatus according to claim 12, wherein the patterns comprise respective series of data symbols, and wherein the finite automaton comprises a deterministic finite automaton that is constructed from the series using an Aho-Corasick algorithm.

21. The apparatus according to claim 12, wherein the patterns are represented by a regular expression, and wherein the finite automaton corresponds to the regular expression.

22. The apparatus according to claim 12, wherein the input sequence comprises a series of data symbols in a data packet received from a network, and wherein the processor is configured to decide on a disposition of the packet responsively to the pattern identified in the packet.

23. A computer software product, comprising a non-transitory computer-readable medium in which program instructions are stored, which instructions, when read by a computer, cause the computer to encode a finite automaton, comprising states and transitions between the states that express a plurality of predefined patterns and labels of states defined by the transitions of the automaton, by grouping the states of the automaton into sets according to a common property comprising a suffix that is common to the labels of all the states in each set, and assigning codes to the states according to the grouping so that the codes of the states in each set have a respective common prefix, wherein the common suffix of the labels of all the states within each set is a label of another state without a last symbol of the label, and to store the codes in an electronic memory, along with rules that are associated with the patterns,
wherein the automaton is traversable in order to identify one or more of the patterns in an input sequence of data elements by iteratively reading out the codes from the memory responsively to the data elements and to the codes that have been previously read out, such that upon identifying a given pattern in the input sequence, an associated action is performed.

24. The product according to claim 23, wherein assigning the codes comprises building a tree comprising nodes corresponding to the sets and edges connecting the nodes, and assigning the codes to the nodes according to a structure of the tree.

25. The product according to claim 24, wherein building the tree comprises arranging the tree so as to minimize a number of bits required to encode the states.

26. The product according to claim 24, wherein assigning the codes comprises assigning respective bit values to the edges, and computing a respective code for each state by concatenating the bit values along the edges leading to a set of minimal size that contains the state.

27. The product according to claim 23, wherein each rule is indicative of a transition to a next state of the finite automaton, and wherein assigning the codes comprises choosing the codes so that there is exactly one rule corresponding to each next state.

28. The product according to claim 23, wherein the instructions cause the computer to store in the memory, for each rule, the respective common prefix and an indication of a next data element associated with a transition corresponding to the rule, and wherein reading out the codes comprises finding a longest matching prefix in the memory for a current state code and data element.

29. The product according to claim 28, wherein the electronic memory comprises an associative memory for storing the common prefix and the indication of the next data element.

30. The product according to claim 23, wherein the instructions cause the computer to encode the finite automaton by defining multiple strides, each stride comprising a respective sequence of transitions in the finite automaton, such that a number of the transitions in the respective sequence is variable among the strides, and assigning state codes to the states and stride codes to the strides, and wherein the rules are defined over both the state codes and the stride codes.

31. The product according to claim 23, wherein the patterns comprise respective series of data symbols, and wherein the finite automaton comprises a deterministic finite automaton that is constructed from the series using an Aho-Corasick algorithm.

32. The product according to claim 23, wherein the patterns are represented by a regular expression, and wherein the finite automaton corresponds to the regular expression.

33. The product according to claim 23, wherein the input sequence comprises a series of data symbols in a data packet received from a network, and wherein the action comprises deciding on a disposition of the packet responsively to the pattern identified in the packet.

* * * * *